United States Patent [19]

Berghöfer

[11] 4,026,585
[45] May 31, 1977

[54] FLEXIBLE PIPE COUPLING

[76] Inventor: Hans Berghöfer, Alte Landstr. 274, Hamburg, Germany

[22] Filed: Aug. 1, 1975

[21] Appl. No.: 601,164

[30] Foreign Application Priority Data

July 14, 1975 Germany .......................... 2531349
Aug. 2, 1974 Germany .......................... 2437240

[52] U.S. Cl. ............................... 285/229; 285/405
[51] Int. Cl.² ........................................ F16L 51/02
[58] Field of Search .......... 285/229, 235, 226, 227, 285/228, 299, 300, 301, 405, 236

[56] References Cited

UNITED STATES PATENTS

| | | | |
|---|---|---|---|
| 2,879,804 | 3/1959 | Hammond | 285/235 X |
| 3,051,512 | 8/1962 | Cranston | 285/235 X |
| 3,164,401 | 1/1965 | Fawkes | 285/229 |
| 3,359,014 | 12/1967 | Clements | 285/229 X |
| 3,552,776 | 1/1971 | Leymann | 285/229 X |
| 3,666,296 | 5/1972 | Fischetti | 285/229 X |

FOREIGN PATENTS OR APPLICATIONS 2,054,781 5/1971 Germany .......................... 285/226

*Primary Examiner*—Thomas F. Callaghan
*Attorney, Agent, or Firm*—Michael J. Striker

[57] ABSTRACT

A flexible pipe coupling wherein the median section of an elastic hose constitutes a bellows and the conical outer sections of the hose taper outwardly from the respective ends of the bellows and have inwardly extending annular collars remote from the bellows. The outer sections have internal sockets for sealing rings which extend into annular grooves machined into the outer end faces of connecting rings serving to secure the outer sections to the flanges of two spaced-apart pipes. When the connecting rings are bolted to the respective flanges, the collars are deformed between the respective connecting rings and flanges, and the sealing rings penetrate into the adjacent grooves and impart to the corresponding outer sections an S-shaped cross-sectional outline. The hose is reinforced by an insert consisting of several layers of steel cords and being embedded into the elastic material of the hose so that it extends into the collars, into the remaining portions of the outer sections as well as into the bellows. The insert is made from a web of metallic filaments which is profiled, coiled and severed to yield blanks conforming in shape to that of the hose. A blank is thereupon placed between inner and outer shells consisting of elastomeric material and the shells are bonded to each other under the action of heat and pressure to form the hose with the blank embedded therein.

22 Claims, 4 Drawing Figures

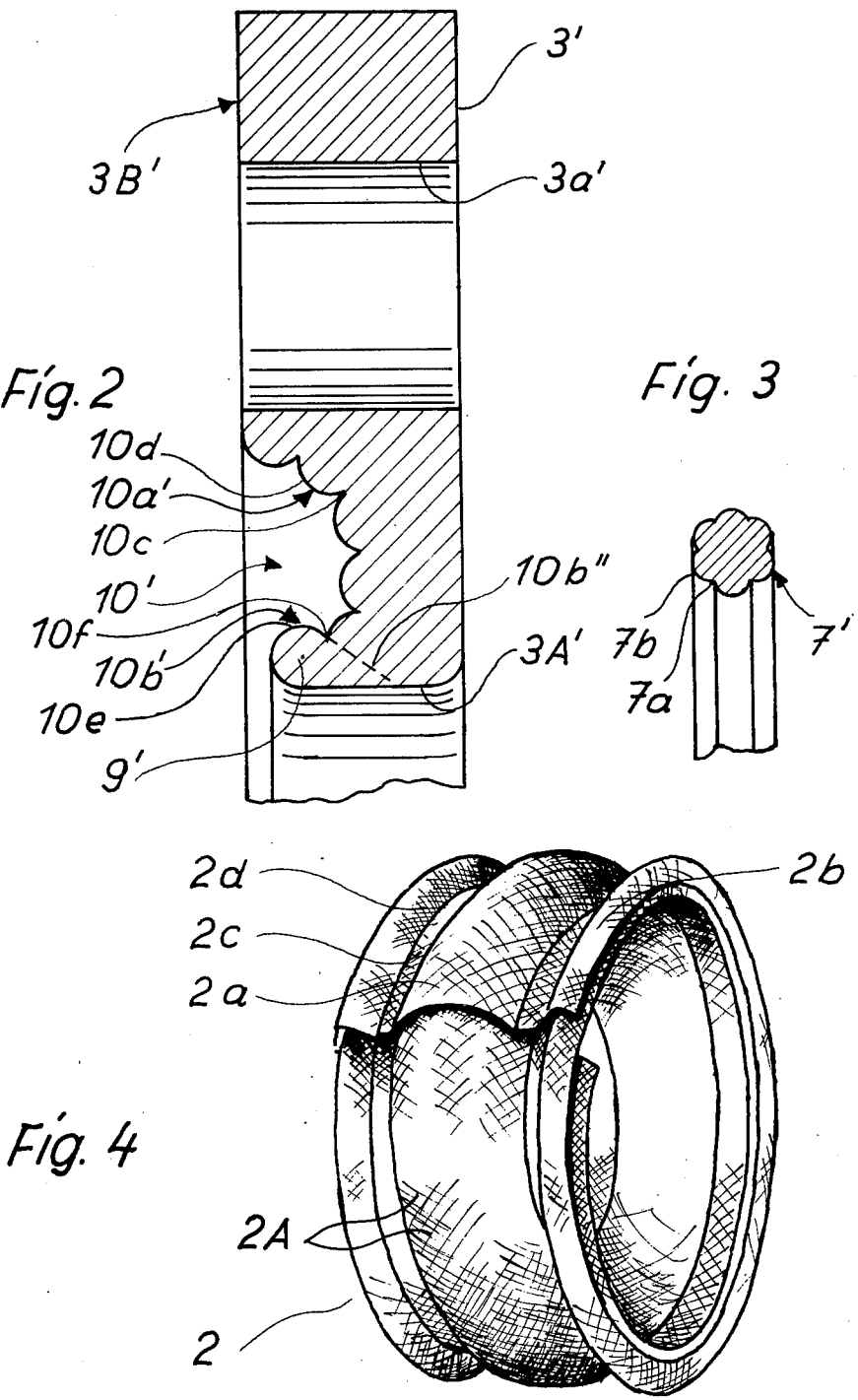

FLEXIBLE PIPE COUPLING

BACKGROUND OF THE INVENTION

The present invention relates to improvements in pipe couplings or fittings, and more particularly to improvements in flexible pipe couplings.

A flexible pipe coupling comprises a flexible tubular member (hereinafter called hose for short) and means for securing the ends of the hose to the respective ends (e.g., flanges of two metallic, plastic or like pipes. It is already known to utilize in a flexible pipe coupling a hose which has an outwardly bulging median section and two outer sections. The hose consists of rubber or elastomeric synthetic plastic material. The means for connecting the outer sections to pipes comprises rings through which the outer sections extend, which have grooves for portions of the outer sections, and which can be fastened to the respective pipes. The median section of the hose compensates for eventual variations in the distance between the pipes as well as for eventual lateral displacements of the pipes relative to each other. The outer sections must sealingly engage the connecting rings as well as the pipes.

Flexible pipe couplings of the just outlined character exhibit many important advantages. However, they are not sufficiently reliable when the pressure of fluid in the pipes is relatively high or very high. Moreover, such conventional flexible pipe couplings cannot stand excessive temperatures and/or pronounced fluctuations of temperatures, either within or outside of the pipe line in which the coupling is mounted. It has been found that, when the pressure in the interior of the flexible coupling rises, the end sections of the hose are likely to become disengaged from the connecting rings and/or from the flanges of the respective pipes so that the pressurized fluid escapes into the surrounding atmosphere.

SUMMARY OF THE INVENTION

An object of the invention is to provide a flexible pipe coupling which can withstand high and extremely high fluid pressures without any leakage of fluid into and/or from their hoses.

Another object of the invention is to provide a flexible pipe coupling which insures a satisfactory sealing action even if the temperature of fluid in the interior and/or outside of the hose fluctuates within a wide range, and even if substantial fluctuations of temperature take place simultaneously with a very pronounced rise of fluid pressure in the hose.

A further object of the invention is to provide novel and improved means for sealingly securing the end sections of the hose in a flexible pipe coupling to the respective pipe ends.

An additional object of the invention is to provide a simple, compact and versatile flexible pipe coupling which can be used in pipe lines for transport of a wide variety of fluids, which can stand the corrosive action of fluids inside or outside of the hose, which can be assembled or dismantled with little loss in time, and which can be used as a superior substitute for presently known flexible couplings in existing pipe lines.

Still another object of the invention is to provide a novel and improved hose for use in the above outlined flexible pipe coupling, to provide the hose with novel and improved reinforcing means, and to provide a novel and improved method of reinforcing the hose.

A further object of the invention is to provide a novel method of making reinforcing inserts for elastic hoses of flexible pipe couplings.

One feature of the invention resides in the provision of a flexible coupling for use between spaced apart flanges or analogous end portions of metallic, plastic of other types of pipes. The coupling comprises an elastic hose having a median section which constitutes a bellows and two preferably conical hollow outer sections flanking the bellows and tapering outwardly from the respective ends of the bellows. Each outer section has an inwardly extending annular collar which is remote from the respective end of the bellows, and each outer section is further provided with an annular internal socket at the radially outermost end of the respective collar. The coupling further comprises metallic or plastic sealing rings which are inserted into the sockets of the outer sections and means for sealingly securing the outer sections to the end portions of the respective pipes. The securing means comprises substantially ring-shaped connecting members having central apertures for the respective outer sections, end faces adjacent to the end portions of the respective pipes, and annular grooves in the respective end faces; such grooves are preferably closely adjacent to and surround the respective apertures. Each connecting member further comprises an annular bead which is disposed between the respective groove and aperture. The securing means further comprises bolts and nuts or other suitable fastener means for affixing the connecting members to the end portions of the respective pipes whereby the sealing rings penetrate into the adjacent grooves and the collars are deformed so as to bear against the end faces of the respective connecting members as well as against the end portions of the respective pipes. Those portions of the surfaces of connecting members which bound the respective grooves are preferably configurated to conform to the cross-sectional outlines of portions of the respective sealing rings.

Another feature of the invention resides in the provision of a method of making a reinforcing blank for incorporation into the elastic material of the aforementioned hose. The method comprises the steps of deforming an elongated web of reinforcing material (e.g., metallic filaments which form two layers with the filaments of one layer extending substantially at right angles to the filaments of the other layer and with all filaments inclined with respect to the longitudinal direction of the web) so that the marginal portions of the thus deformed web conform to the outlines of the outer sections of a hose and the median portion of the deformed web conforms to the outline of the bellows, coiling the thus profiled web and separating therefrom a length whose configuration conforms to that of the hose, and embedding the just mentioned length of the web into the elastic material of the hose. The severed length of the web may consist of several (e.g., two) overlapping convolutions.

The embedding step may comprise placing the severed length between inner and outer tubular shells consisting of rubber or elastomeric synthetic plastic material, and bonding the shells to each other to thereby convert the shells into a hose with the severed length of profiled and coiled web embedded in the material of the hose.

The novel features which are considered as characteristic of the invention are set forth in particular in the appended claims. The improved pipe coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a fragmentary axial sectional view of a modified connecting ring which can be used in the improved flexible coupling;

FIG. 3 is a fragmentary sectional view of a sealing ring which can be used in a flexible coupling utilizing connecting rings of the type shown in FIG. 2; and FIG. 4 is a perspective view of a reinforcing insert for the hose of the improved flexible coupling.

DESCRIPTION OF THE PREFERRED EMBODIMENTS

Figure 1:
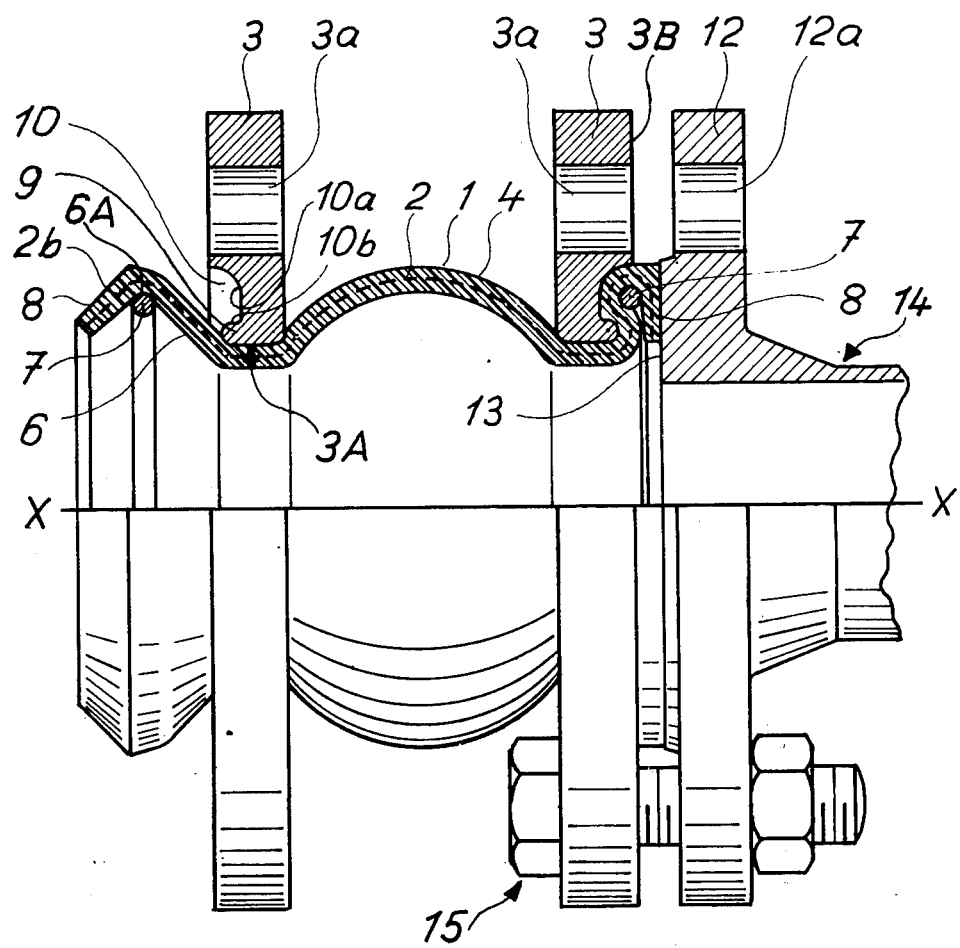
FIG. 1 is a fragmentary schematic partly elevational and partly central longitudinal sectional view of a flexible pipe coupling which embodies one form of the invention.

The flexible coupling of FIG. 1 is utilized to establish a leakproof connection between two pipes 14 (only one shown) having end portions or flanges 12 provided with annuli of openings 12a. The coupling comprises an elongated hose 1 consisting of rubber or elastomeric synthetic plastic material and including an outwardly bulging hollow concavo-convex median section or bellows 4 and two hollow conical outer sections 6 each having an inwardly extending end portion or collar 8. The bellows 4 may be made longer and may include two or more outwardly bulging portions alternating with inwardly bulging portions. The outer sections 6 taper outwardly in directions away from the respective ends of the bellows 4 and their collars 2 may be disposed in planes which are normal to the axis X—X of the coupling or taper inwardly in directions away from the respective ends of the bellows. The entire hose 1 is preferably reinforced by an insert 2 which may be of the type shown in FIG. 4. In accordance with a presently preferred embodiment, the insert 2 consists of one or more layers of steel cords, wires or analogous metallic filaments forming interlaced or overlapping helices. As shown in FIG. 4, the insert 2 may comprise a median portion 2a which conforms to the shape of and is embedded in the bellows 4, two annular constrictions 2c which flank the median portion 2a, and two conical outer portions 2d which are embedded in the material of the respective outer sections 6 and have inwardly extending annular end portions 2b in the respective collars 8. As a rule, the insert 2 will be shaped prior to incorporation into the material of the hose 1 so that its configuration will match or closely resemble that which the hose assumes prior to being placed into sealing engagement with the flanges 12.

The means for sealingly securing the conical outer portions 6 of the hose 1 to the respective flanges 12 comprises two connecting rings 3 each having a set of openings 3a in register with the openings 12a of the adjacent flange, a central aperture 3A through which a portion of the hose 1 extends, and an annular groove 10 in that end face (3B) which faces the outer end face 13 of the respective flange 12. The connecting rings 3 can be affixed to the adjacent flanges 12 by bolts and nuts 15, screws or analogous fasteners portions of which extend through the registering openings 3a, 12a. The grooves 10 are separated from the respective apertures 3A by annular beads 9 which are preferably rounded at the outer end faces 3B as well as at the inner end faces 3D of the respective connecting rings 3. The surfaces which bound the grooves 10 include concave portions 10a which extend along arcs of approximately 90° and substantially cylindrical portions 10b which constitute the external surfaces of the respective beads 9.

Each outer section 6 of the hose 1 defines an internal socket or seat 6A for a metallic or plastic sealing ring 7 having a circular cross-sectional outline. The sockets 6A are adjacent to the inner sides of the radially outermost parts of the collars 8. The curvature of surface portions 10a bounding the radially outermost parts of the grooves 10 is similar to the curvature of the cross-sectional outlines of sealing rings 7. Thus, when the flexible coupling is assembled, the centers of curvature of cross-sectional outlines of surface portions 10a are located in or close to the planes which are normal to the axes of and halve the respective sealing rings 7.

As shown in the right-hand portion of FIG. 1, the diameters of sealing rings 7, the diameters of beads 9 and the diameters of grooves 10 are selected with a view to insure that the outer sections 6 of the hose 1 undergo more pronounced compressive and deforming action in the spaces between the sealing rings 7 and beads 9. This contributes significantly to prevention of leakage of fluid from the interior of the pipe line including the pipes 14 and the flexible coupling and/or penetration of fluid into the pipe line.

The surface surrounding the groove 10 and the bead 9 of a connecting ring 3 has a substantially S-shaped outline. Also, when an outer section 6 is properly clamped between a ring 3 and a flange 12, it has a substantially S-shaped cross-sectional configuration. This is shown in the right-hand portion of FIG. 1.

When the flexible coupling of FIG. 1 is to be assembled, the outer sections 6 of the hose 1 are deformed and slipped through the apertures 3A of the respective connecting rings 3. The collars 8 are thereupon flexed outwardly to allow for insertion of sealing rings 7 into the respective sockets 6A, and the rings 3 are thereupon secured to the adjacent flanges 12 so that the outer sides of the collars 8 bear against the sealingly engage the outer end faces 13 of the respective flanges 12. The rings 7 are forced to enter the respective grooves 10, together with portions of the outer sections 6, whereby such outer sections sealingly engage the surface portions 10a, 10b and undergo maximum deformation between the rings 7 and the respective beads 9. If the rings 3 are properly affixed to the respective flanges 12, i.e., if the outer end faces 3B of the rings 3 are moved sufficiently close to the outer end faces 12 of the adjacent flanges, the sealing action which is established between the outer sections 6 and the end faces 13 as well as between the outer sections 6 and the connecting rings 3 suffices to insure that the coupling will not leak even at elevated pressures of fluid in and/or around the hose 1 and even if such elevated pressures develop simultaneously with a pronounced increase of temperature of fluid within and/or without the couping. As a matter of fact, as the pressure in the interior of the hose 1 increases, the force with which the collars 8 of the outer sections 6 are urged against the end faces 13 of the respective flanges 12 also increases so that the sealing action improves. In other words, the maximum sealing action is determined primarily by the magnitude of forces which the hose 1 can stand without undergoing partial or complete destruction.

It is clear that the rings 3 of FIG. 1 constitute but one form of connecting means which can be used to establish sealing engagement with the flanges 12 or analogous end portions of pipes which are to be sealingly coupled to each other. For example, the outermost portions of rings 3 may be provided with sleeves (not shown) whose internal threads can be moved into mesh with external threads at the peripheries of the flanges 12. Also, each ring 3 may be assembled of two or more arcuate portions. Still further, the flanges 12 may include internally threaded sleeves which can mesh with external threads at the peripheries of the rings 3. All that counts is to insure that the connecting members can be detachable secured to the respective flanges 12 and that they can subject the respective outer sections 6 to deforming stresses which suffice to guarantee a leakproof engagement of such outer sections with the flanges and with the connecting members even if the pressure and/or temperature of fluid or fluids inside or outside of the coupling fluctuates within a wide range.

FIG. 2 shows a portion of a modified connecting ring 3' having openings 3a', a central aperture 3A', an annular groove 10' in that end face (3B') which faces toward the adjacent flange (not shown in FIG. 2), and an annular bead 9' which is disposed between the groove 10' and the aperture 3A'. The surface portions 10a of the rings 3 shown in FIG. 1 are replaced by concave surface portions 10a' having several convex annular facets 10d alternating with annular recesses 10c. The surface portion 10b' has two or more annular convex facets 10e and at least one annular recess 10f, i.e., one recess 10f between each pair of neighboring facets 10e.

A sealing ring 7' which can be used in a flexible coupling employing connecting rings 3' of the type shown in FIG. 2 is illustrated in FIG. 3. This sealing ring has several circumferentially extending convex facets 7b alternating with annular recesses or notches 7a. When the sealing ring 7' enters a groove 10' (with a portion of an outer section 6 between the sealing ring and the surface portions 10a', 10b'), the notches 7a register with the facets 10d, 10e and the facets 7b register with the recesses 10c, 10f. The utilization of rings 3' and 7' further enhances the sealing action of the improved flexible coupling.

The sealing ring 7' can be replaced with a sealing ring of polygonal cross-sectional outline and/or the convex facets 10d, 10e of the ring 3' can be replaced by flat facets. A sealing ring of polygonal cross-sectional outline can be used with the connecting rings 3 or 3', and connecting rings having flat facets can be used with sealing rings 7, 7' or those having a polygonal cross-sectional outline. If the sealing rings have a polygonal cross-sectional outline, the meeting edges of their facets are preferably rounded or chamfered. It is also possible to use sealing rings having an elliptical cross-sectional outline. The exact configuration of the sealing rings will depend, at least to a certain extent, on the nature of the material of hose 1, the dimensions of grooves 10 or 10' and beads 9 or 9', and certain other factors.

In certain embodiments of the improved flexible coupling, the connecting rings can be simplified by replacing the specially designed surface portions 10b or 10b' with conical surface portions whose contour corresponds to that of the adjacent portions of outer sections 6. Thus, and referring to FIG. 2, the rather complex bead 9' can be replaced with a much simpler bead having a wedge-shaped cross-sectional outline (the conical peripheral surface of such simplified bead is indicated by a phantom line 10b'').

The insert 2 of FIG. 4 can be produced as follows: One can start with an elongated web having a width which exceeds the axial length of the insert 2 and preferably consisting of interlaced steel wires or cords 2A which are arranged in criss-cross fashion so that they make oblique angles with the longitudinal direction of the web. The web is thereupon caused to pass through a gap between suitable profiling rolls or analogous profiling implements which convert the marginal portions of the web into the portions 2b, 2d, which form the annular constrictions 2c, and which shape the concavo-convex median portion 2a. If desired, the web can be coated (at one or both sides) with one or more layers of non-vulcanized rubber or like material. The number of layers, the diameters of cords 2A, and the density of the web will depend on the desired strength of the hose 1. As a rule, the web will have at least two layers of cords disposed at right angles to each other so as to form substantially rectangular interstices.

The profiled web can be coiled to form a bundle consisting of overlapping convolutions in a manner similar to that of coiling photographic film on the core of a supply reel or takeup reel. The thus coiled material is then severed to yield unit lengths or blanks each of which preferably comprises two or more concentric convolutions. The insert 2 of FIG. 4 has two complete convolutions. The thus obtained blanks are thereupon coated with a suitable adhesive (preferably from inside as well as from without) and each blank is placed between two annular shells consisting of rubber or other suitable elastomeric material. The outer side of the inner shell and the inner side of the outer shell is also coated with an adhesive. The two shells are thereupon bonded to each other and to the blank under the action of heat and pressure (preferably in a manner known from the art of vulcanizing tires for automotive vehicles) to be thereby converted into a finished hose 1 which is ready to be assembled with rings 3 and 7 and sealingly connected to the flanges 12 of two pipes 14. The blank is simultaneously converted into an insert 2 which is preferably fully embedded in the elastomeric material. If desired, the profiled web can be converted into blanks while being inserted between the aforementioned shells.

If the hose of the improved flexible coupling does not have to stand substantial thermal stresses and/or fluid pressures, inserts of the type shown in FIG. 4 can be replaced with other types of inserts, for example, with inserts consisting of textile material which is embedded in the elastomeric material It is preferred to utilize textile material which consists of synthetic plastic filaments. Furthermore, and if the flexible coupling is to be used in pipe lines which convey fluids at low pressure and/or wherein the temperature outside and/or in the interior of the coupling fluctuates very little or not at all (and the temperature is not high), the improved coupling can utilize a hose which does not have any reinforcing inserts. The omission of inserts significantly reduces the manufacturing cost of the hoses. Even in the absence of reinforcing inserts, the improved flexible coupling is superior to conventional couplings because the sealing action between the outer sections of the hose and the flanges of the respective pipes is much more satisfactory.

In assembling the hose 1 with the rings 3 and 7 or 3' and 7', the outer sections 6 are preferably slipped through the central apertures of the rings 3 and 3' and the sealing rings 7 or 7' are preferably inserted into the respective sockets 6A prior to complete setting of elastomeric material, especially if the finished hose is relatively stiff so that the insertion of outer sections into the connecting rings and/or the insertion of sealing rings into the sockets would necessitate the exertion of substantial forces.

It has been found that the improved insert contributes significantly to the resistance which the hose can offer to elevated fluid pressures. Such resistance is further enhanced by the novel connections between the outer sections 6 and the respective pipes 14. The just mentioned connections prevent leakage of fluid at pressures which cannot be withstood, at least not for long periods of time, by heretofore known flexible couplings. Experiments with the improved coupling have shown that a hose having an inner diameter of 50 millimeters and being reinforced with steel cords can stand internal bursting pressures in the range of 200 bar or more. Also, the sealing action between the outer sections 6 and the pipes remained intact at extremely high temperatures.

The improved flexible coupling is susceptible of many additional modifications without departing from the spirit of the invention. The exact design of the coupling will depend on its intended use, on the temperatures and/or pressures which the hose must withstand in actual use, on the nature (e.g., corrosive effect) of fluids which are conveyed through and/or which surround the hose, and on certain other factors. The designer has practically unlimited freedom in the selection of elastomeric material for a hose which does not contain any reinforcing inserts and/or a reinforced hose, in the selection of strength, type and flexibility of the insert, and/or in the selection of connecting members which secure the outer sections to the respective pipes. As mentioned above, the median section of the hose (and hence the median portion of the insert, if any) may comprise several outwardly bulging portions alternating with inwardly bulging portions. Also, the exact configuration of sealing rings (such as 7 and 7') will depend on the strength of elastomeric material, on the desired sealing action, on the configuration of surfaces which bound the beads and/or grooves of the respective connecting members, and other factors. Still further, the inclination or conicity of outer sections 6 and/or their collars 8 will depend on a number of variables, such as the configuration of surfaces bounding the grooves and/or beads of the connecting members. It is also within the purview of the invention to coat the hose with internal and/or external layers or films of a material which is highly resistant to temperatures, which can stand extensive mechanical stresses (such as frictional engagement with solid bodies) and/or which is highly resistant to the corrosive influence of acids or other chemicals in the fluid passing through the pipe line or in the surrounding area.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. A flexible coupling for interconnecting two axially spaced-apart pipe ends, said coupling comprising an axially tubular elastic hose having a median section forming a bellows, two outer sections axially flanking said bellows and flaring outwardly therefrom in unmounted condition of said hose, and two collars axially flanking said outer sections and tapering inwardly therefrom in unmounted condition of said hose, said collars each forming with the respective outer section a radially inwardly opening seat; a support ring in each of said seats; two annular connecting members each having an end face turned axially away from said bellows and engaging a respective outer section, each end face having an annular axially opening groove axially alignable with the respective support ring; and fastening means for securing each of said connecting members to a respective pipe end face bearing axially on the respective outer section, the respective pipe end bearing axially on the respective collar, and the respective support ring at least partially received with a portion of the respective outer section in the respective groove.

2. A coupling as defined in claim 1, wherein said connecting members have surfaces bounding said grooves and each of said surfaces has a portion whose curvature conforms substantially to the curvature of the cross-sectional outline of the respective ring.

3. A coupling as defined in claim 1, wherein each of said connecting members has an aperture for the respective outer section and said grooves surround and are closely adjacent to the respective apertures.

4. A coupling as defined in claim 1, further comprising at least one reinforcing insert in said hose.

5. A coupling as defined in claim 4, wherein said insert has portions in each section of said hose.

6. A coupling as defined in claim 4, wherein said insert has portions embedded in the collars of said outer sections.

7. A coupling as defined in claim 4, wherein said insert consists of metallic filaments.

8. A coupling as defined in claim 7, wherein said filaments are steel cords.

9. A coupling as defined in claim 7, wherein said filaments form several overlapping layers including a first and a second layer, the filaments of said first layer being substantially normal to the filaments of said second layer.

10. A coupling as defined in claim 4, wherein said insert constitutes a prefabricated blank which conforms to the shape of and is embedded in the material of said hose.

11. A coupling as defined in claim 1, wherein each of said connecting members has an aperture for the respective outer section and an annular bead intermediate the aperture and the respective groove.

12. A coupling as defined in claim 11, wherein said outer sections include substantially S-shaped portions overlying the respective beads and surrounding the respective rings.

13. A coupling as defined in claim 11, wherein each of said connecting members has a surface bounding the respective groove and bead, each of said surfaces having a substantially concave annular portion bounding the respective groove and having an outline conforming to appoximately one-fourth of the cross-sectional outline of the respective ring, and a substantially cylindrical portion constituting the peripheral surface of the respective bead.

14. A coupling as defined in claim 11, wherein the inner diameters of said rings and the outer diameters of said beads are such that said outer sections are subjected to a pronounced deforming action intermediate the respective rings and beads.

15. A coupling as defined in claim 1, wherein at least one of said rings has a substantially circular cross-sectional outline.

16. A coupling as defined in claim 1, wherein at least one of said rings has a polygonal cross-sectional outline.

17. A coupling as defined in claim 16, wherein said one ring has a plurality of annular facets and rounded annular portions between neighboring facets.

18. A coupling as defined in claim 1, wherein at least one of said rings has a plurality of convex annular facets and annular notches alternating with said facets.

19. A coupling as defined in claim 1, wherein said connecting members have apertures for the respective outer sections and annular beads intermediate said apertures and the respective grooves, each of said connecting members further having a surface bounding the respective groove and the respective bead, each of said surfaces having a first portion bounding the respective groove and a second portion surrounding the respective bead, each of said first and second portions having a plurality of convex annular facets and annular recesses alternating with said facets.

20. A coupling as defined in claim 1, further comprising a reinforcing insert embedded in said hose, said insert having at least one profiled convolution conforming to the outline of said hose.

21. The coupling defined in claim 1, wherein said outer sections and said collars are substantially frustoconical in unmounted condition of said hose and extend generally radially in mounted condition of said hose.

22. The coupling defined in claim 1, wherein said grooves and rings are of substantially the same diameter.

* * * * *